(12) United States Patent
Burgo

(10) Patent No.: US 6,508,323 B2
(45) Date of Patent: Jan. 21, 2003

(54) HOOD FOR EARTHMOVING MACHINES

(75) Inventor: Giuseppe Burgo, Imola (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/732,154

(22) Filed: Dec. 7, 2000

(65) Prior Publication Data

US 2001/0004949 A1 Jun. 28, 2001

(30) Foreign Application Priority Data

Dec. 17, 1999 (IT) .................................. B099 A 000693

(51) Int. Cl.[7] .............................................. B62D 25/10
(52) U.S. Cl. ................................ 180/69.21; 180/89.17; 180/69.2
(58) Field of Search ........................... 180/69.2, 69.21, 180/69.24, 900, 89.17; 296/194; 414/722, 727

(56) References Cited

U.S. PATENT DOCUMENTS

| | | | | |
|---|---|---|---|---|
| 3,064,748 A | * | 11/1962 | Hill .......................... | 180/69.21 |
| 4,128,180 A | * | 12/1978 | Mellious ..................... | 414/339 |
| 4,319,653 A | * | 3/1982 | Carlson ..................... | 180/89.17 |
| 5,248,237 A | * | 9/1993 | Nakamura .................. | 172/273 |
| 5,265,995 A | * | 11/1993 | Beck ........................... | 414/694 |
| 5,596,826 A | * | 1/1997 | Barden ........................ | 37/466 |
| 5,782,312 A | * | 7/1998 | Murakawa ................. | 180/69.2 |
| D406,151 S | * | 2/1999 | Cunningham et al. ....... | D15/25 |
| D438,877 S | * | 3/2001 | Gukeisen et al. ............ | D15/28 |
| D447,754 S | * | 9/2001 | Smith et al. ................. | D15/31 |

* cited by examiner

Primary Examiner—Robert P. Olszewski
Assistant Examiner—James S. McCleelan
(74) Attorney, Agent, or Firm—Larry W. Miller; John William Stader

(57) ABSTRACT

A hood for earthmoving machines, such as a backhoe, includes a top panel and two side panels extending beneath and on opposite sides of the top panel to form a substantially upside down U-shaped shell resting on a frame of the vehicle to close the engine compartment of the backhoe. The side panels extend substantially parallel to a vertical centerline plane of the vehicle and are hinged to the frame of the vehicle to rotate, about an axis of rotation substantially perpendicular to the vertical centerline plane of the vehicle, between an open position in which the side panel is located over the top panel to permit access to the engine compartment, and a closed position in which the side panel is located beneath the top panel to close the engine compartment.

2 Claims, 2 Drawing Sheets

HOOD FOR EARTHMOVING MACHINES

BACKGROUND OF THE INVENTION

The present invention relates generally to a hood for earthmoving machines and, more particularly, to a hood for the engine compartment of a backhoe in which a front bucket arm hinged to the vehicle frame to move parallel to the vertical centerline plane of the vehicle, and a bucket or shovel hinged to the free end of the bucket arm to rotate about an axis of rotation perpendicular to the vertical centerline plane of the vehicle.

The bucket arm is normally fixed to the vehicle frame between the cab and the engine compartment, and is defined by two half-arms hinged to the vehicle on opposite sides of the vehicle frame so that each is movable in a plane parallel to the vertical centerline plane of the vehicle, and by a transverse stiffening member connecting the two half-arms rigidly to each other.

Since the engine compartment is enclosed permanently between the two half-arms of the bucket arm, the engine compartment hood currently comprises a top panel fixed permanently to the vehicle frame over the engine inside the compartment, and two side panels fixed to the vehicle frame on opposite sides of the engine so as to close the engine compartment in an upside down U-shaped shell. The two side panels can obviously be taken off the frame to enable access to the inside of the engine compartment.

Hoods of the above type have the major drawback of not being very practical, on account of the size and weight of the side panels making them difficult to handle.

Moreover, when removed for access to the engine compartment, the side panels are very often set aside carelessly and, when the work on the engine is completed, are often crushed by the vehicle leaving the service area because the mechanic has forgotten to fit them back onto the frame.

SUMMARY OF THE INVENTION

It is an object of the present invention to provide a hood for earthmoving machines, which is more practical than currently known types.

According to the present invention, there is provided a hood for earthmoving machines, the hood comprising a top panel, and two side panels extending beneath and on opposite sides of the top panel to form a substantially upside down U-shaped shell resting on a frame of the vehicle to close a generic compartment of said vehicle; said hood being characterized in that said side panels extend substantially parallel to a vertical centerline plane of the vehicle; and in that at least one of said side panels is hinged to the frame of the vehicle to rotate, about an axis of rotation substantially perpendicular to said vertical centerline plane of the vehicle, between an open position in which the side panel is located over said top panel to permit access to said compartment, and a closed position in which the side panel is located beneath said top panel to close the compartment.

These and other objects, features and advantages are accomplished according to the instant invention by providing a hood for earthmoving machines, such as a backhoe, which includes a top panel and two side panels extending beneath and on opposite sides of the top panel to form a substantially upside down U-shaped shell resting on a frame of the vehicle to close the engine compartment of the backhoe. The side panels extend substantially parallel to a vertical centerline plane of the vehicle and are hinged to the frame of the vehicle to rotate, about an axis of rotation substantially perpendicular to the vertical centerline plane of the vehicle, between an open position in which the side panel is located over the top panel to permit access to the engine compartment, and a closed position in which the side panel is located beneath the top panel to close the engine compartment.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENTS

Figure 1:
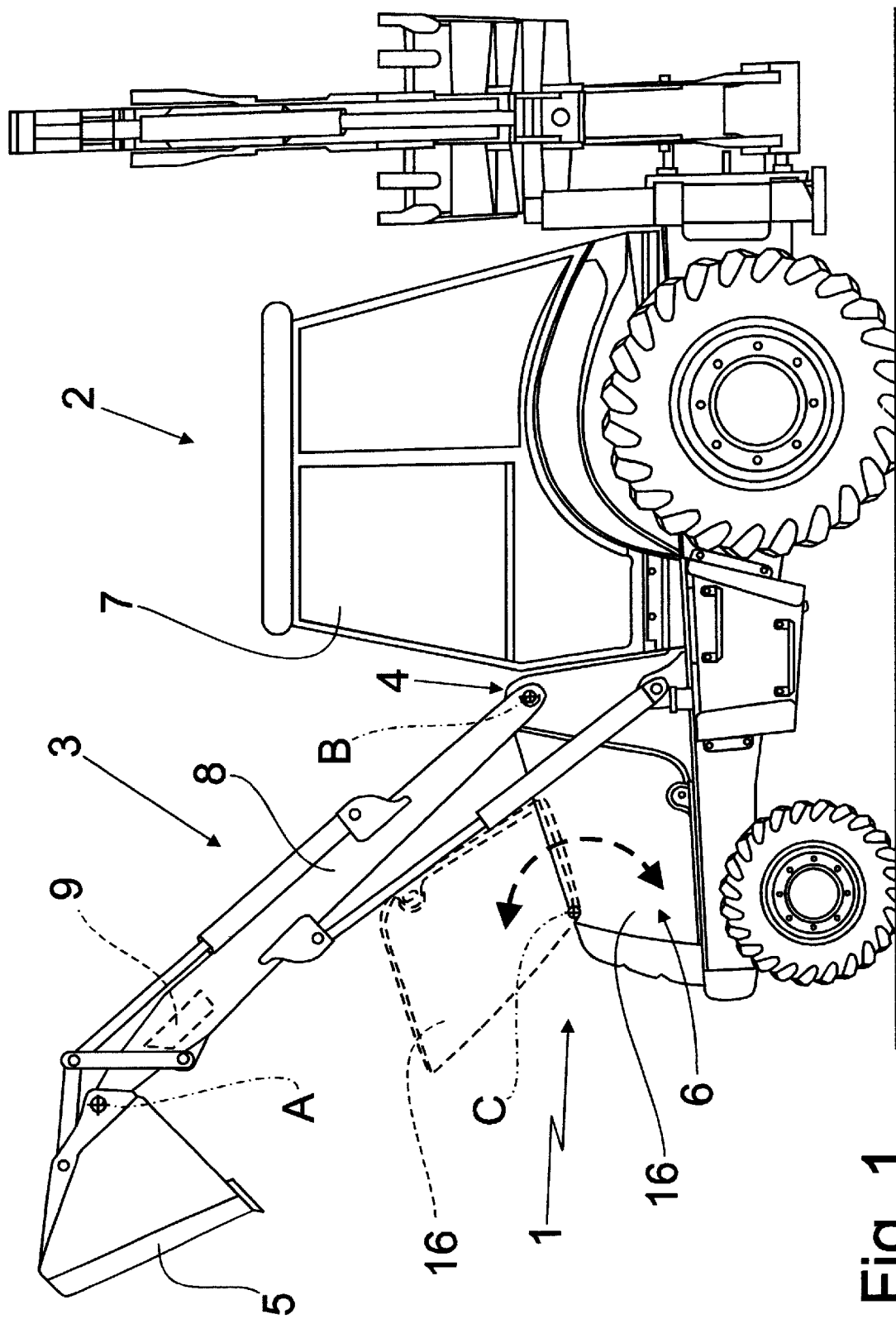
FIG. 1 is a side elevational view of an earthmoving machine, commonly referred to as a backhoe, featuring an engine compartment hood incorporating the principles of the present invention, the movement of the hood being shown in dashed lines.

Referring first to the perspective view of FIG. 1, a work vehicle 2, commonly referred to as a backhoe, incorporating the principles of the instant invention can best be seen. The backhoe 2 includes a front bucket arm 3 hinged to the frame 4 of the vehicle to move parallel to a vertical centerline plane P of the vehicle, and a bucket or shovel 5 hinged to the end of bucket arm 3 to rotate about an axis of rotation A perpendicular to the vertical centerline plane P of the vehicle. The backhoe 2 is powered by an engine mounted in an engine compartment 6 supported by the frame 4 of the backhoe 2. A hood I encloses the engine compartment. The engine compartment 6 and an operator's cab 7 define the front and central portions of the backhoe 2, respectively. The bucket arm 3 is hinged to the vehicle frame 4 between engine compartment 6 and cab 7 so as to rotate about an axis of rotation B perpendicular to the centerline plane P of the backhoe 2.

In the example shown, the bucket arm 3 is defined by two half-arms 8 hinged to the vehicle frame 4 on opposite sides of the vehicle, preferably between the engine compartment 6 and the cab 7, so that each lies and is movable in a plane parallel to the vertical centerline plane P of the vehicle. A stiffening bar 9 interconnects the two half-arms 8 rigidly to each other.

Figure 2:
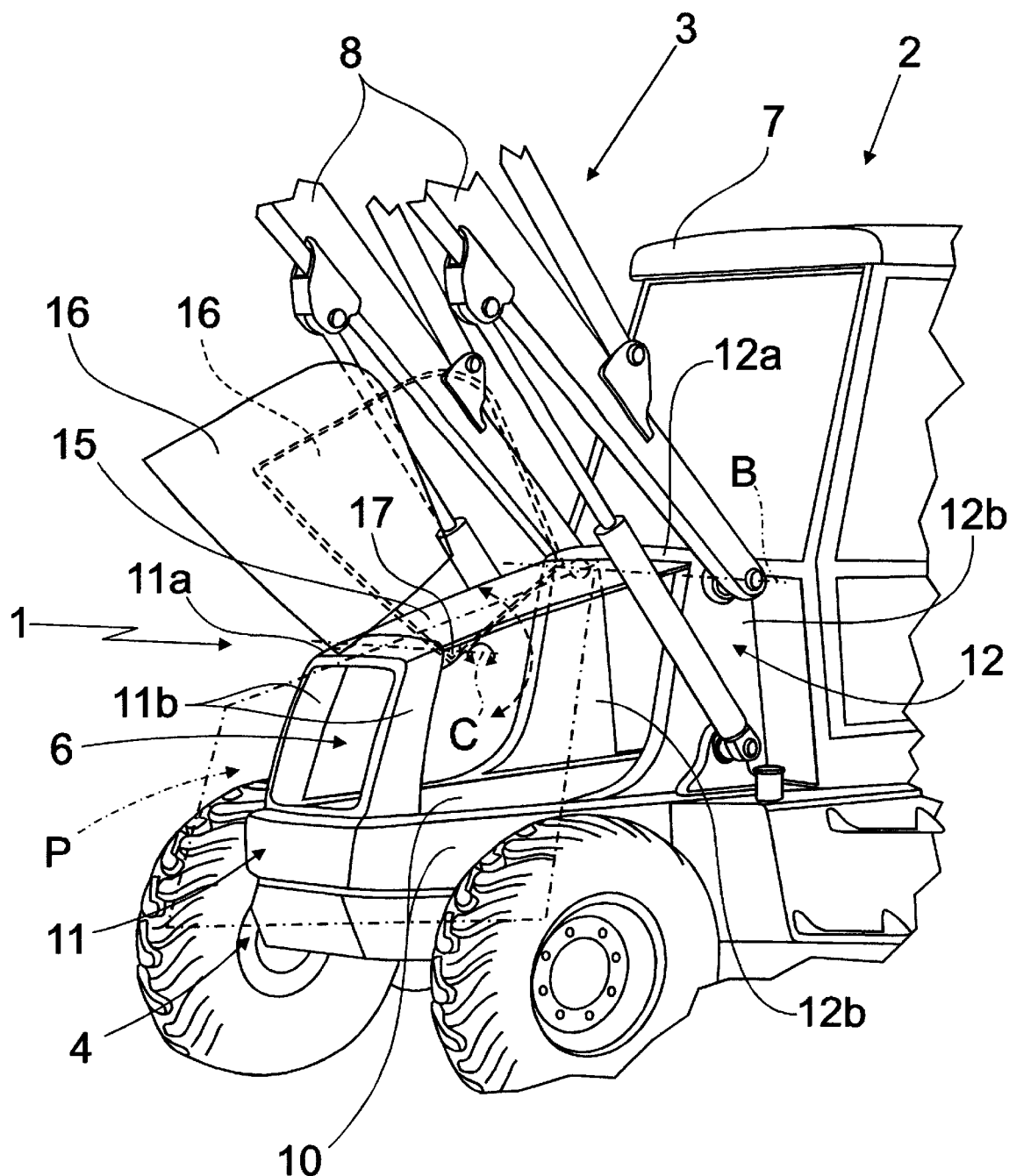
FIG. 2 is an enlarged partial perspective view of the backhoe shown in FIG. 1 with parts removed for the purpose of clarity, to depict the front of the backhoe showing the engine compartment hood in detail, the movement of the hood being shown in dashed lines.

With reference to FIG. 2, in the example shown, frame 4 is formed with two longitudinal members 10 extending horizontally on opposite sides of the vertical centerline plane P and along the full length of the vehicle and a number of stiffening ribs 11, 12 connecting the two longitudinal members 10 to each other. More specifically, the frame 4 comprises a front rib 11 to which the front of the vehicle is fixed; and a central rib 12 to which the bucket arm 3 is hinged directly.

Ribs 11 and 12 laterally define the engine compartment 6 and are preferably, though not necessarily, gantry-shaped, i.e. in the form of an inverted U-shape configuration.

With reference to FIGS. 1 and 2, the engine compartment hood I includes a top panel 15, and two side panels 16 extending beneath and on opposite sides of the top panel 15 to form a substantially upside down U-shaped shell resting on vehicle frame 4 to close off the engine compartment 6.

More specifically, the top panel 15 projects between the horizontal cross members 11a and 12a of ribs 11 and 12 to close the top of the engine compartment 6; and the two side panels 16 project, on opposite sides of the top panel 15, between the vertical posts 11b and 12b of the ribs 11 and 12 to close the engine compartment 6 laterally. The top panel 15 projects between the horizontal cross members 11a and 12a of the ribs 11 and 12 perpendicularly to the vertical centerline plane P of the vehicle, and is fixed permanently to the vehicle frame 4.

Each side panel 16, on the other hand, projects between a vertical post 11b of rib 11 and a vertical post 12b of rib 12 in a direction generally parallel to the vertical centerline plane P of the vehicle. The side panel 16 is hinged to the vehicle frame 4 to rotate, about an axis of rotation C perpendicular to the vertical centerline plane P of the vehicle, between a closed position shown in FIG. 1 in which the side panel 16 is positioned between the vertical posts 11b and 12b of the ribs 11 and 12 to close the engine compartment 6, and an open position shown in FIG. 2 in which the side panel 16 is located over the top panel 15 to permit access to the engine compartment 6.

As depicted in the drawings, each side panel 16 is substantially trapezoidal and hinged to the frame 4 at a vertex 17 close to the joint between the horizontal cross member 11a and the vertical post 11b of the front rib 11, so as to permit access to the engine compartment 6 by rotating the side panel 16 upwards and towards the bucket 5. The axes of rotation C of the two side panels 16 are obviously coincident.

A hood 1 for the engine compartment 6 constructed as set forth above has the advantage of not requiring the side panels 16 to be removed from the backhoe 2 and set aside when access is required to the engine compartment 6 since the side panels 16 are fixed to the vehicle frame 4. Furthermore, when in the open position, the side panels 16 are clearly visible from the cab 7, thus ruling out any risk of the vehicle being operated with side panels 16 still in the open position with the engine compartment 6 exposed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an earthmoving machine having an elongated wheel-supported frame with a front end and an opposing rear end and a vertical centerline plane through said front and rear ends; said frame including two longitudinal generally horizontal frame members spaced-apart on opposite sides of said centerline plane extending between said front and rear ends; an engine mounted on said frame adjacent said front end; said engine having a top, two opposing sides and front and rear opposing ends generally perpendicular to said two opposing sides, all generally between said frame members; an operator's cab mounted on said frame; a pair of bucket arms hinged to said frame to rotate about an axis of rotation generally perpendicular to said centerline plane for movement in a vertical plane generally parallel to said vertical centerline plane, one on each side of said engine; first and second similar generally inverted U-shaped ribs, each rib comprised of a pair of generally parallel spaced-apart legs connected at corresponding top ends by a cross member, interconnecting said two frame members, one adjacent each of said front and rear ends of said engine; the improvement comprising:

a hood for generally enclosing the top and sides of said engine, defining an engine compartment, said hood including:
 a) a top panel generally parallel to a plane perpendicular to said centerline plane and permanently affixed to said cross member of both said first and second ribs;
 b) first and second side panels affixed to respective legs of said inverted U-shaped ribs, one on each side of said engine and resting on respective said frame members, each in a plane generally parallel to said centerline plane;
 c) each said side panel is trapezoidal in plan view and each said side panel is hinged by one vertex adjacent the top of the respective leg to said rib adjacent said front of said engine to rotate independently of the other of said side panels in a plane generally parallel to said centerline plane selectively between a closed position in which said side panel rests on said respective frame member and an open position in which said side panel is located over said top panel, whereby each said side panel may be selectively rotated upwardly and forwardly about the respective vertex to provide access to said engine.

2. An earthmoving machine comprising:

an elongated wheel-supported frame with a front end and an opposing rear end and a vertical centerline plane through said front and rear ends, said frame including two longitudinal generally horizontal frame members spaced-apart on opposite sides of said centerline plane extending between said front and rear ends;

an engine mounted on said frame adjacent said front end; said engine having a top, two opposing sides and front and rear opposing ends generally perpendicular to said two opposing sides, all generally between said frame members;

an operator's cab mounted on said frame;

a pair of bucket arms hinged to said frame to rotate about an axis of rotation generally perpendicular to said centerline plane for movement in a vertical plane generally parallel to said vertical centerline plane, one on each side of said engine;

first and second similar generally inverted U-shaped ribs, each comprised of a pair of generally parallel legs connected at corresponding top ends by a cross member, interconnecting said two frame members, one adjacent each of said front and rear ends of said engine;

a hood for generally enclosing the top and sides of said engine, defining an engine compartment, said hood including:
 a top panel generally parallel to a plane perpendicular to said centerline plane and permanently affixed to said first and second ribs;
 first and second side panels affixed to respective legs of said inverted U-shaped ribs, one on each side of said engine and resting on respective said frame members, each in a plane generally parallel to said centerline plane;
 each said side panel is trapezoidal in plan view and each said side panel is hinged by one vertex adjacent the top of the respective leg to said rib adjacent said front of said engine to rotate independently of the other of said side panels in a plane generally parallel to said centerline plane selectively between a closed position in which said side panel rests on said respective frame member and an open position in which said side panel is located over said top panel, whereby each said side panel may be selectively rotated upwardly and forwardly about the respective vertex to provide access to said engine.

* * * * *